(12) United States Patent
Thompson et al.

(10) Patent No.: US 7,577,632 B2
(45) Date of Patent: Aug. 18, 2009

(54) UPDATING ESTIMATED PROCESS RUNTIME

(75) Inventors: Daniel J. Thompson, Redmond, WA (US); Jonathan A. Hoover, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 11/422,193

(22) Filed: Jun. 5, 2006

(65) Prior Publication Data
US 2007/0283340 A1    Dec. 6, 2007

(51) Int. Cl.
G06N 5/02 (2006.01)
G06N 7/02 (2006.01)
G06N 7/06 (2006.01)
G06F 9/44 (2006.01)
G06F 9/445 (2006.01)

(52) U.S. Cl. .................. 706/47; 717/168; 717/173; 717/174; 717/178; 706/52; 702/186

(58) Field of Classification Search ......... 717/124–131, 717/168–178, 135; 116/308; 706/14, 52, 706/62, 47; 702/179–186; 714/25–26, 819, 714/821
See application file for complete search history.

(56) References Cited

U.S. PATENT DOCUMENTS

| | | | |
|---|---|---|---|
| 6,038,588 A | 3/2000 | Nagarajayya | |
| 6,275,987 B1 * | 8/2001 | Fraley et al. ................. | 717/174 |
| 6,414,697 B1 | 7/2002 | Amro | |
| 6,639,687 B1 | 10/2003 | Nielsen | |
| 6,865,717 B2 | 3/2005 | Wright | |
| 6,901,558 B1 | 5/2005 | Andreas | |
| 6,927,770 B2 | 8/2005 | Ording | |
| 2003/0182409 A1 * | 9/2003 | Seaman ....................... | 709/223 |
| 2006/0013555 A1 | 1/2006 | Poslinski | |
| 2006/0020966 A1 | 1/2006 | Poslinski | |
| 2006/0045470 A1 | 3/2006 | Poslinski | |
| 2006/0167784 A1 * | 7/2006 | Hoffberg ...................... | 705/37 |
| 2007/0192723 A1 * | 8/2007 | Anzelde et al. ............. | 715/772 |

FOREIGN PATENT DOCUMENTS

GB    2378629    2/2003

OTHER PUBLICATIONS

Murray Crease & Stephen Brewster, "Making Progress With Sounds—The Design & Evaluation Of An Audio Progress Bar", http://www.des.gla.ac.uk/-stephen/papers/ICAD98_MC.PDF.

Dan Kokotov and Ilya Shlyakhter, "Progress Bar for SAT Solvers", Aug. 29, 2000, http://sdg.lcs.mit.edu/satsolvers/ProgressBar.ps.

(Continued)

*Primary Examiner*—David R Vincent
*Assistant Examiner*—Benjamin Buss
(74) *Attorney, Agent, or Firm*—Shook, Hardy & Bacon, LLP.

(57) ABSTRACT

Systems and methods for updating estimated process runtimes are provided. Initially, an estimated runtime for a process, the estimated runtime being based on a default value or at least one previously recorded actual runtime, is received. An actual runtime of the process is then recorded and the estimated runtime for the process is automatically updated utilizing the recorded actual runtime.

17 Claims, 6 Drawing Sheets

OTHER PUBLICATIONS

"Package org.netbeans.api.progress", via website on Mar. 27, 2006, http://www.netbeans.org/project/www/download/dev/javadoc/org-netbeans-api-progress/org/netbeans/api/progress/package-summary.html.

"Progress Bars", via website on Mar. 27, 2006, http://msdn.microsoft.com/library/default.asp?url=/library/en-us/UxGuide/UXGuide/Controls/ProgressBars.asp.

* cited by examiner

UPDATING ESTIMATED PROCESS RUNTIME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

There are many different ways to inform a user of a running status of a process. For example, a progress bar is frequently used to indicate to a user the relative progress made by a process being executed. A progress bar helps a user to find out how far a process has advanced towards its completion. It is also a good indicator of how fast the process is executed. For instance, a progress bar is often used for a process of downloading data from a network such as the Internet to indicate how much of the data has been downloaded. A user can also perceive the rate at which the data is downloaded from the speed at which the progress bar is advancing. Another example of the usefulness of progress bars is in software installation processes. By viewing the progress bar, a user can find out how far the installation process has advanced. The user can also see how quickly the installation process is advancing.

Users often rely on progress bars for making many decisions. For instance, a slow moving progress bar may convince a user who is downloading a file from the Internet to find some other things to do rather than waiting for the downloading process to complete. Additionally, a user who is connected to a paying Internet station at, for instance, an airport may decide to stop downloading a file prior to completion if the user can infer from a slow moving progress bar that s/he may not have enough time to finish downloading the file before the boarding time, thereby saving on a service fee that is charged by minutes of usage.

Often, however, many of intended benefits associated with using a progress bar are defeated due to lack of intelligence behind the mechanism for advancing the progress bar. In many instances, a progress bar reaches the end of the bar track even though the process associated with the progress bar is still being executed. Also, in many instances, a progress bar may stop advancing for awhile and then jump to the end of the bar track all of sudden in a fraction of a second, or may even repeat a cycle of such behavior during a single running instance. Users under such circumstances have no way of predicting how far a process really has advanced or of learning a likely speed at which the process is being executed.

Currently, advancing mechanisms of a progress bar rely on rather crude techniques. For example, an advancing mechanism may rely on a single runtime or a small set of runtimes that has been manually measured by a individual using a stopwatch or even a wristwatch that the person was wearing at the time of measurement. Further, an instruction that advances a progress bar for a unit distance may be placed among the instructions that make up a process associated with the progress bar. Because users may run a process on systems of different capabilities and different operational environments, however, such crude techniques often fail to provide even the minimum intelligence that is required to confer intended benefits of using a progress bar.

SUMMARY

Embodiments of the present invention provide systems and methods for updating an estimated runtime for a process. In one embodiment, prior to initiation of a process run, an estimated runtime for the process is received that is based on at least one prior actual runtime for the process. Subsequently, as the process is executed, an actual runtime for the process is recorded. The recorded actual runtime is then utilized to automatically update the estimated runtime that will be used for the next subsequent process run. In one embodiment, the estimated runtime for the process is based on an average of the actual recorded runtimes of all prior process runs.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
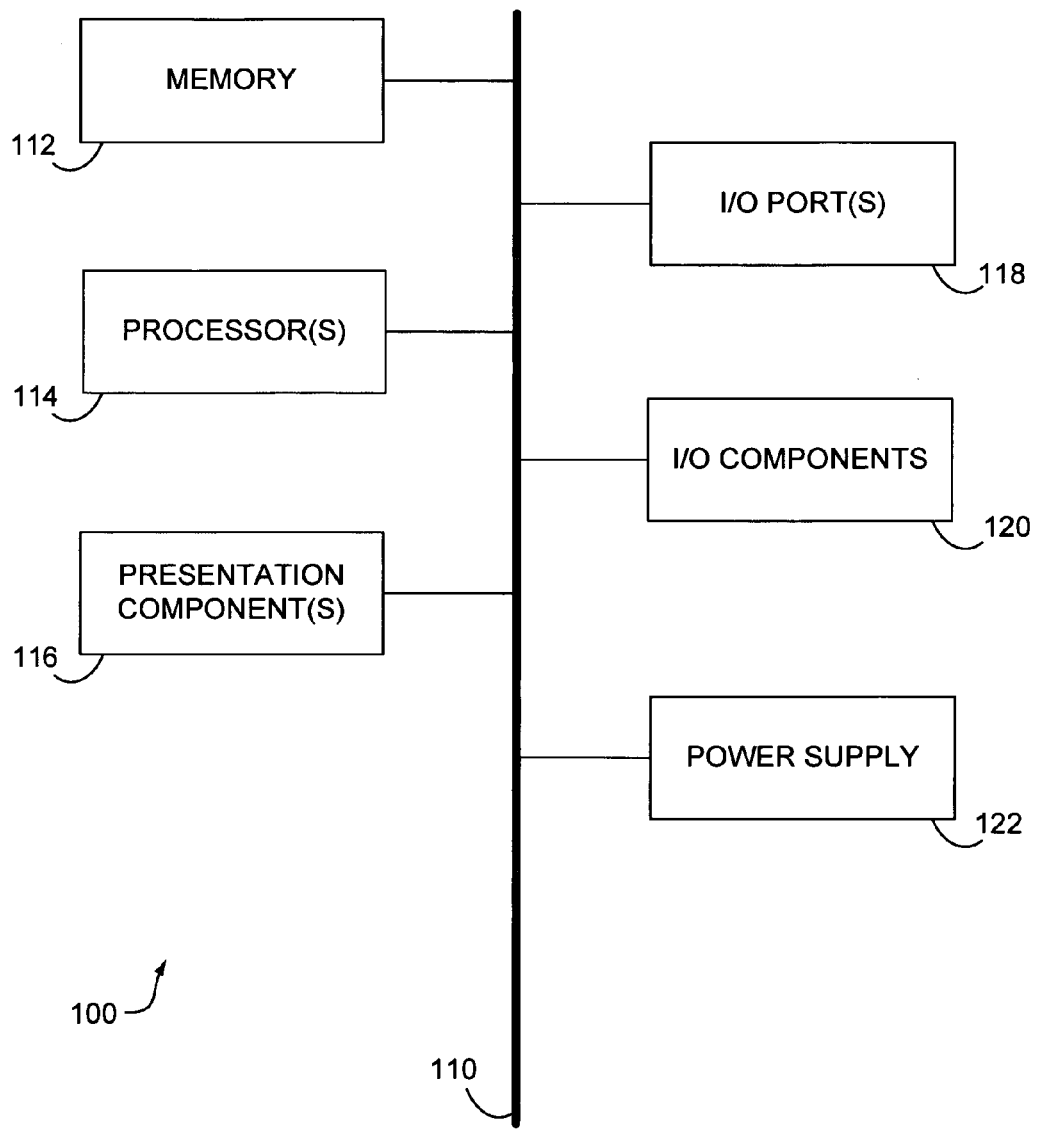
FIG. 1 is a block diagram of a computing system environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for updating estimated runtimes for processes. Utilizing the systems and methods disclosed herein, process runtimes, e.g., data download, software installation, or software update runtimes, may be more accurately predicted thus enabling users to more confidently rely on runtime indicators in planning their activities.

Accordingly, one embodiment of the present invention is directed to a method for updating an estimated runtime for a process. The method includes receiving an estimated runtime for the process, the estimated runtime being based on at least one prior actual runtime for the process; recording an actual runtime for the process; and automatically updating the estimated runtime utilizing the recorded actual runtime. If desired, the method may further include presenting an indicator of the estimated runtime for the process.

In another embodiment, the present invention is directed to a system for updating an estimated runtime for a process. The system includes an executer component configured to measure an actual runtime for the process and to utilize the actual runtime to update the estimated runtime for the process; a repository configured to store one or more information items related to the process; and a presentation component configured to present an indicator of at least one of the one or more information items.

In yet another embodiment, the present invention is directed to a method for updating an estimated runtime for a process that includes a plurality of distinct units. The method includes receiving an indication to execute at least a portion of the process; determining based on a system environment which of the plurality of distinct units comprise the portion of the process to be executed; receiving the estimated runtime for the portion of the process to be executed, the estimated runtime comprising a sum of estimated runtimes for each of the distinct units comprising the portion of the process to be executed; recording an actual runtime for each of the distinct units comprising the portion of the process; and automatically updating the estimated runtimes for each of the distinct units comprising the portion of the process utilizing the respective recorded actual runtimes.

Embodiments of the present invention are further directed to computer-readable media having computer-executable instructions for performing the methods disclosed herein.

Having briefly described an overview of the present invention, an exemplary operating environment for embodiments of the present invention is described below.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network. In a distributed-computing environment, program modules may be located in both local and remote computer-storage media including memory-storage devices. The computer-useable instructions form an interface to allow a computer to react according to a source of input. The instructions cooperate with other code segments to initiate a variety of tasks in response to data received in conjunction with the source of the received data.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
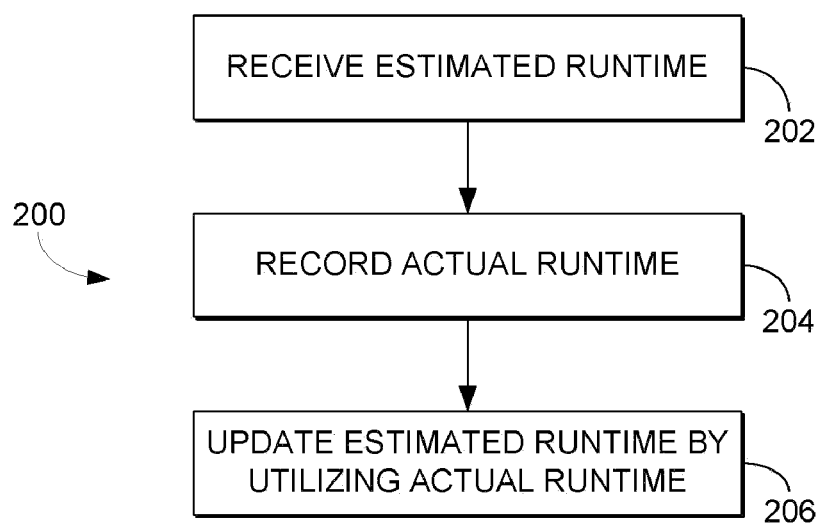
FIG. 2 is a flow diagram illustrating a method in accordance with an embodiment of the present invention for updating an estimated runtime for a process.

Turning now to FIG. 2, a method 200 is illustrated in accordance with one embodiment of the present invention for updating an estimated runtime for a process. Initially, at 202, an estimated runtime for a process is received. In one embodiment, for example, before the process is executed, the estimated runtime may be read from a repository such as, but not limited to, a file, a memory location, or a database. At 204, an actual runtime for the process is recorded. At 206, the estimated runtime is automatically updated, that is, without user intervention, utilizing the recorded actual runtime of the process. In one embodiment, for instance, the estimated runtime may be updated in accordance with an average runtime of the process using one or more previously recorded actual process runtimes. In another embodiment, the estimated runtime of the process may be updated using a different algorithm. For instance, the average runtime may be calculated using only the actual runtimes that fall within a predefined range of runtime values, thereby preventing runtime values that are abnormally high or low from influencing the coherency of the average runtime. As will be appreciated by those skilled in the art, a variety of ways may be available for updating the estimated runtime. Any and all such variations, and combinations thereof, are contemplated to be within the scope of embodiments of the present invention.

Advantageously, utilizing the methods herein disclosed, an actual runtime of a process is recorded and an estimated runtime of the process is automatically updated utilizing the recorded actual runtime. As such, as execution of the process is repeated, the estimated runtime of the process becomes normalized for a variety of operational environments and more closely parallels the actual runtime of the process.

Figure 3:
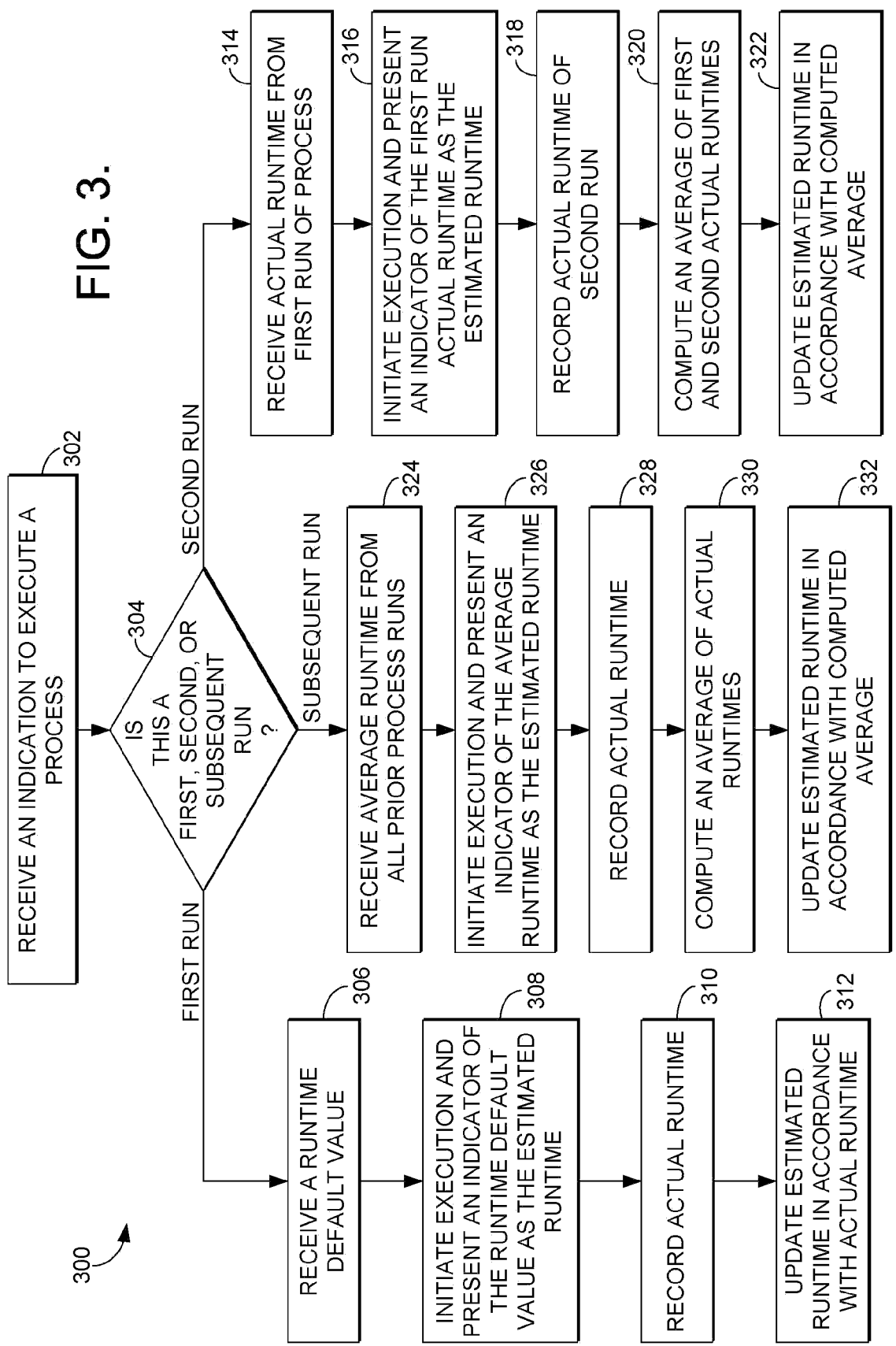
FIG. 3 is a flow diagram of a method for updating an estimated runtime for a process according to an embodiment of the present invention, the method having more detail than the method shown in FIG. 2.

With reference to FIG. 3, a flow chart of an exemplary method 300 for updating an estimated runtime for a process is illustrated, the method having more detail than the method illustrated in FIG. 2. Initially, an indication to execute a process is received at 302. Subsequently, at 304, it is determined whether the process is being run for the first time, the second time, or a subsequent time. If it is determined that the process is being run for the first time, a default runtime value is received at 306 that is utilized as an estimated runtime. The default runtime value may be provided initially based upon a reasonable guess. In one embodiment, for example, the default runtime value may be based on theoretical calculations using factors such as, but not limited to, clock speed of a processor that may run the process. Subsequently, at 308, execution of the process is initiated and an indicator of the default runtime value as the estimated runtime is presented. In one embodiment, for example, a progress bar is used to indicate a relative progress of the process being executed based on the default runtime value. In another embodiment, audible recordings may be used to present a status of the executing process based on the default runtime value. As will be appreciated by those skilled in the art, a variety of ways may be available for presenting a status of an executing process. Any and all such variations, and combinations thereof, are contemplated to be within the scope of embodiments of the present invention.

Upon completion of the process execution, an actual runtime of the process is recorded at 310. In one embodiment, for example, the clock speed of a main processor of an operating environment in which the process is executed may be utilized to record the actual runtime. In another embodiment, a specialized module or component may be used to measure the actual runtime. Next, at 312, the estimated runtime is automatically updated in accordance with the actual runtime recorded and the updated estimation is stored in association with the process for use in subsequent runs of the process, as more fully described below.

If it is determined at 304 that the process is being run for the second time, the actual runtime from the first run of the process is received at 314 to be utilized as the estimated runtime for the second run of the process. In one embodiment, for example, the actual runtime of the first run of the process may be read from a repository such as, but not limited to, a file or a memory location. In another embodiment, the actual runtime of the first run of the process may be read from a database. Next at 316, execution of the process is initiated and an indicator of the actual runtime of the first run is presented as the estimated runtime. Upon completion of the second process execution, an actual runtime of the second run is recorded at 318. At 320, an average of the first and the second actual runtimes is computed. In another embodiment, however, the method 300 may use a different algorithm to calculate an estimated runtime using the first and the second actual runtimes. At 322, the estimated runtime is automatically updated in accordance with the computed average of the first and the second actual runtimes.

If it is determined at 304 that the process is being run subsequent to the second time, an average runtime of all of prior successful process runs is received at 324 to be utilized as the estimated runtime for the subsequent run in question. If desired, one or more prior actual runtimes may be removed when calculating the average runtime. For instance, the method may remove a prior actual runtime that deviates too far off from a range of runtime values, thereby enhancing the coherency of the average runtime. At 326, execution of the process is initiated and an indicator of the average runtime is presented as the estimated runtime. Subsequently, at 328, the actual runtime of the process run being executed is recorded. At 330, an average runtime is computed using the prior received average runtime and the recorded actual runtime of the run in question. Subsequently, the estimated runtime is automatically updated at 332 in accordance with the computed average runtime.

Figure 4:
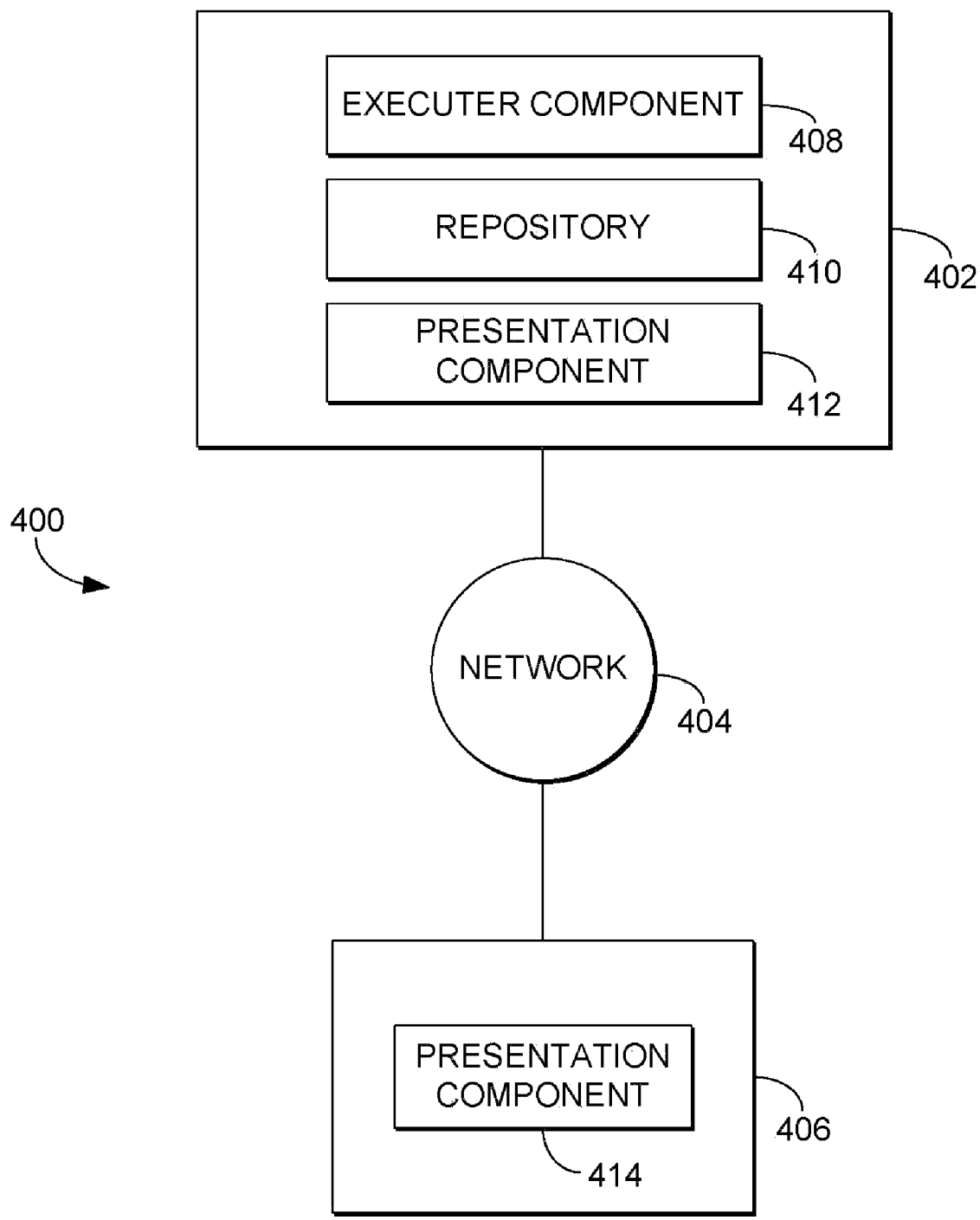
FIG. 4 is a block diagram illustrating a system in accordance with an embodiment of the present invention for updating an estimated runtime for a process.

Turning now to FIG. 4, a block diagram illustrating a system 400 in accordance with one embodiment of the present invention for updating an estimated runtime for a process is shown. The system 400 includes a host device 402, a remote device 406, and a network that couples the host device 402 and the remote device 406. The host device 402 contains an executer component 408, a repository 410, and a presentation component 412. In one embodiment, the host device 402 has at least one processor. In accordance with exemplary embodiments of the present invention, the network 404 may be, but is not limited to, a local area network, a wide area network, a wireless network, or the Internet. In one exemplary embodiment, the remote device 406 also has at least one processor. The remote device 406 also includes a presentation component 414, such component being similar to the presentation component 412 of the host device 402 which is more fully described.

In one embodiment, the executer component 408 of the host device 402 is configured to measure an actual runtime for a process and to utilize the actual runtime to update an estimated runtime for the process. In another embodiment, the executer component 408 is further configured to automatically update the estimated runtime for the process upon receiving an actual runtime for the process.

The repository 410 of the host device 402 is configured to store one or more information items related to a process. In one embodiment, the repository 410 is a file containing the information items. In another embodiment, the repository 410 is at least one memory location. In yet another embodiment, the repository 410 is a database or a part thereof. Any and all such variations are contemplated to be within the scope of embodiments hereof. Information items which may be stored in association with the repository 410 include, but are not limited to, actual and estimated runtimes for a process, as well as process run counts.

The presentation component 412 of the host device 402 is configured to present an indicator of one or more information items stored in association with the repository 410. In one embodiment, the presentation component 412 is configured to display a progress bar that illustrates a relative status of the estimated runtime of an executing process. In another embodiment, the presentation component 412 is configured to render an audible indication of a status of an executing process. For instance, a recorded voice may announce information such as, but not limited to, an estimated time remaining until the completion of the process. In one exemplary embodiment, the presentation component 412 may run on the remote device 406 to present status information that is stored in the repository 410 for one or more processes.

Advantageously, the system 400 can measure an actual runtime for a process, store information associated with the process, including an estimated runtime of the process that is updated based on the actual runtime, and present the information to a user. In one embodiment, the executer component 408 measures an actual runtime of a process being executed on the remote device 406 and updates the estimated runtime of the process utilizing the actual runtime. In another embodiment, the repository 410 can store information that is associated with a process being executed on the remote device 406. In yet another embodiment, the presentation component 412 runs on the remote device 406 to present status information associated with a process being executed on the remote device 406.

Figure 5:
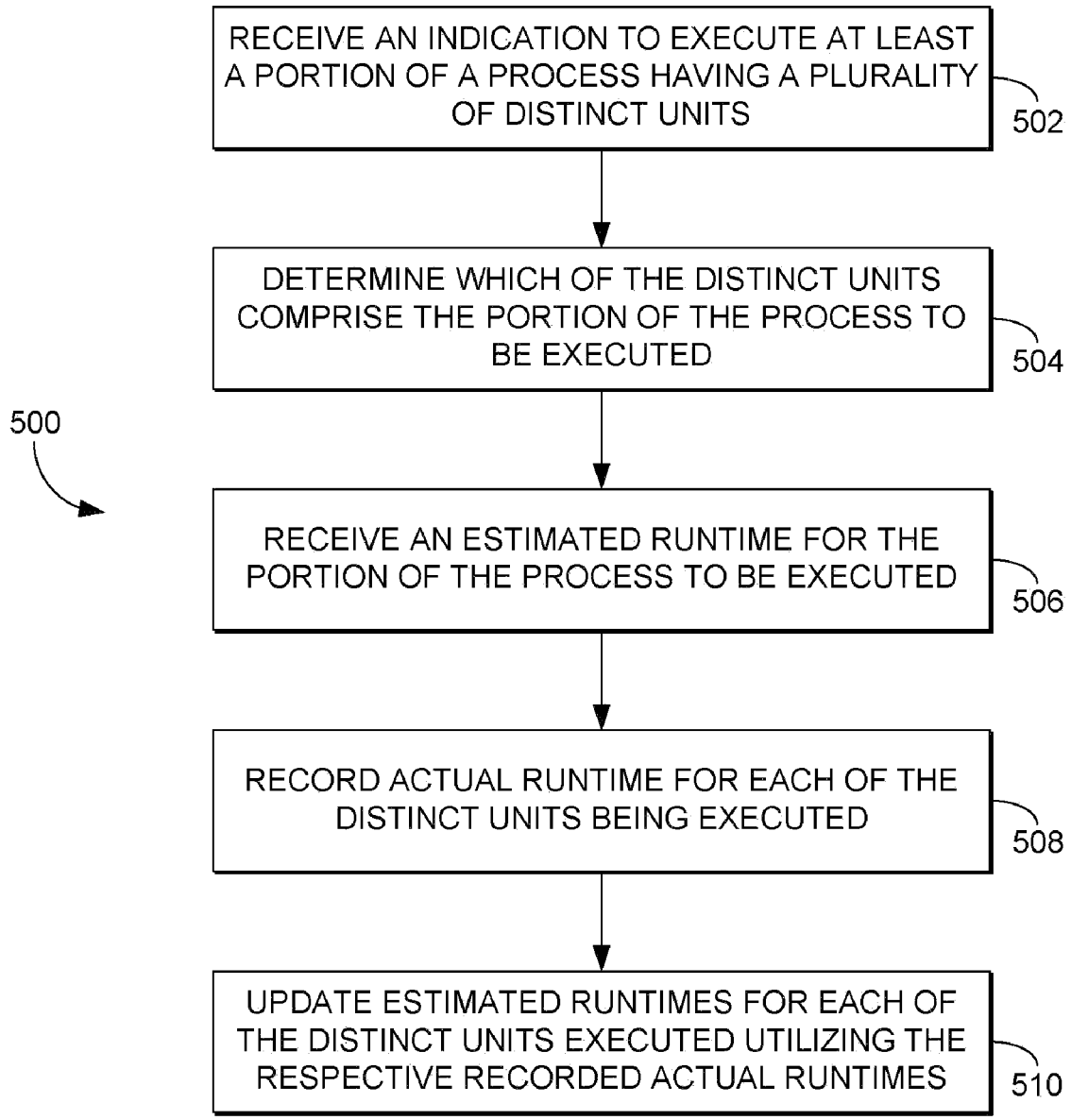
FIG. 5 is a flow diagram illustrating a method in accordance with an embodiment of the present invention for updating an estimated runtime for a process that includes more than one distinct unit.

Turning now to FIG. 5, a method 500 in accordance with one embodiment of the present invention for updating an estimated runtime for a process that includes more than one distinct unit is illustrated. Initially, at 502, an indication is received to execute at least a portion of a process having a plurality of distinct units. At 504, it is determined which of the distinct units comprise the portion of the process to be executed. In one embodiment, for example, one or more of the distinct units may be specially adapted to run only in a specific operating environment. For instance, one of the distinct units may run only if the process is executed in Unix or Linux operating environment. In another embodiment, a user may be asked to determine whether execution of one or more of the distinct units is to be skipped. In yet another embodiment, one or more of the distinct units may run only if a particular version of a service pack module has been installed.

Subsequently, at 506, an estimated runtime is received for each of the distinct units that has been determined to comprise the portion of the process to be executed. In one embodiment, for example, the method 500 receives the estimated runtime from a repository such as, but not limited to, a file, a memory location, or a database. The repository, in one embodiment, contains an estimated runtime of each of the distinct units. Next, an actual runtime for each of the distinct units being executed is recorded at 508. At 510, the estimated runtime for each of the distinct units executed is subsequently updated utilizing the respective actual runtime recorded at 508. In one embodiment, the method 500 calculates an average of all prior actual runtimes for each of the distinct units and updates the estimated runtime for each of the distinct units in accordance with the respective average runtimes.

Advantageously, the method 500 uses a sum of average runtimes for two or more of the distinct units of a process to determine an estimated runtime for the portion of the process being executed. Accordingly, the method 500 may be readily adapted for a variety of different operating environments with different hardware capacity, software architectures, or a combination thereof. In one embodiment, for example, one or more of the distinct units of a process are adapted to run only if a capacity to connect to the Internet is present. In another embodiment, one or more of the distinct units of the process are adapted to run only for an operating environment that supports a set of particular APIs.

Figure 6:
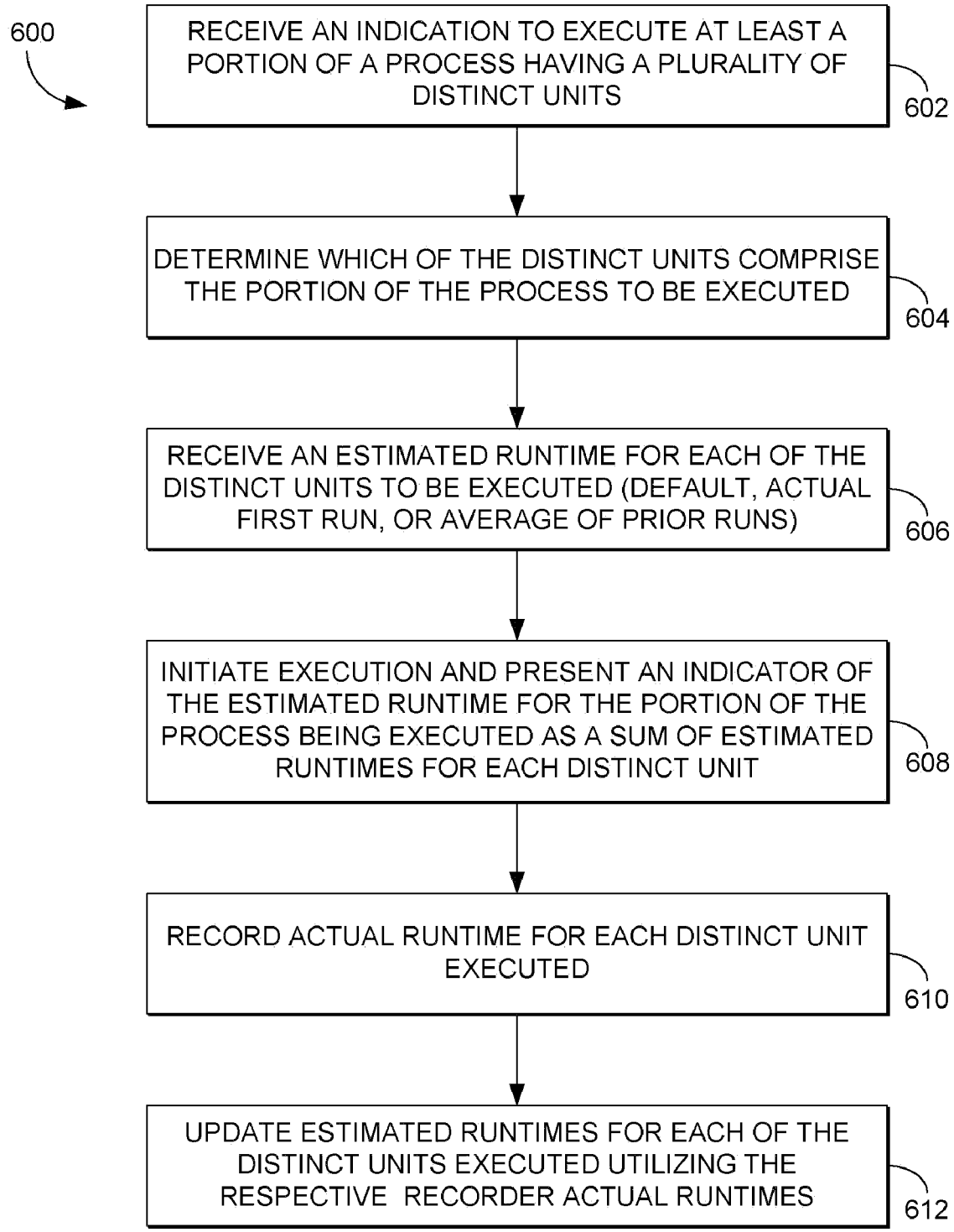
FIG. 6 is flow diagram illustrating a method in accordance with an embodiment of the present invention for presenting and updating an estimated runtime for a process that includes more than one distinct unit, the method having more detail than the method shown in FIG. 5.

FIG. 6 illustrates a method 600 in accordance with one embodiment of the present invention for presenting and updating an estimated runtime for a process that includes more than one distinct unit, the method having more detail than the method shown in FIG. 5. Initially, at 602 an indication to execute at least a portion of a process having or more distinct units is received. At 604, it is determined which of the distinct units comprise the portion of the process to be executed. At 606, an estimated runtime for each of the distinct units to be executed is received. In one embodiment, an estimated runtime of one of the distinct units contains a default runtime value initially assigned to the unit if the unit is run for the first time. In another embodiment, an estimated runtime of one of the distinct units contains the actual runtime of the unit's first run if the unit is run for the second time. In yet another embodiment, an estimated runtime of one of the distinct units contains an average of actual runtimes of the unit's prior runs if the unit is run subsequent to the second time. At 608, execution of the process is initiated and an indicator of the estimated runtime for the process being executed is presented. In one embodiment, the indicator is a progress bar for reporting a relative progress of the process. At 610, an actual runtime for each of the distinct units being executed is recorded. Subsequently, at 612, the estimated runtimes for each of the distinct units executed is updated using the respective actual runtime of the distinct units recorded at 610.

Embodiments of the present invention provide systems and methods for automatically updating estimated runtimes for processes utilizing prior recorded actual runtimes. Utilizing the systems and methods disclosed herein, process runtimes, e.g., data download or software installation runtimes, may be more accurately predicted thus enabling users to more confidently rely on runtime indicators in planning their activities.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method using one or more processors for updating an estimated runtime for a process comprising at least one of a data download, a software installation, and a software update, the method comprising:
   receiving an estimated runtime for the process having a plurality of distinct units, wherein the estimated runtime for the process comprises a sum of estimated runtimes for each of the distinct units of at least a portion of the process to be executed, the estimated runtime for each of the distinct units being based on actual runtimes of prior executions of the corresponding distinct unit of the process;
   recording an actual runtime for each of the distinct units of the at least the portion of the process; and
   automatically updating the estimated runtimes for each of the distinct units of the at least the portion of the process utilizing the respective recorded actual runtimes.

2. The method of claim 1, further comprising presenting an indicator of the estimated runtime for the process.

3. The method of claim 2, wherein the indicator comprises a progress bar.

4. The method of claim 1, wherein the estimated runtime for each of the distinct units comprises an average of two or more prior actual runtimes for the process.

5. The method of claim 1, wherein the estimated runtime comprises a sum of average actual runtimes for two or more of the plurality of distinct units.

6. The method of claim 5, wherein the actual runtime for the process includes a sum of actual runtimes for fewer than all of the plurality of distinct units based on a system environment in which the process is executed.

7. One or more computer readable storage media having computer-executable instructions for performing the method of claim 1.

8. A computerized system having a processor and memory, the computerized system for updating an estimated runtime for a process comprising at least one of a data download, a software installation, and a software update, the system comprising:

an executer component configured to measure an actual runtime for each of a plurality of distinct units of the process and to utilize the actual runtimes to update an estimated runtime for each of the distinct units of the process, wherein the updated estimated runtime for each of the distinct units is used to estimate runtimes for subsequent runs of the process, or distinct units thereof;

a repository configured to store one or more information items related to the process; and a presentation component configured to present an indicator of at least one of the one or more information items.

9. The system of claim 8, wherein the executor component is further configured to automatically update the estimated runtime for each of the distinct units of the process upon measuring the actual runtime for each of the distinct units.

10. The system of claim 8, wherein the estimated runtime for a distinct unit of the process comprises an average of two or more actual runtimes of prior executions of the respective distinct unit.

11. The system of claim 8, wherein the estimated runtime for the process comprises a sum of estimated runtimes for two or more of a plurality of distinct units comprising the process.

12. The system of claim 8, wherein at least one of the one or more information items includes a default runtime for the process, an estimated runtime for the process, an identifier of at least one distinct unit comprising the process, a default runtime for at least one distinct unit comprising the process, or an estimated runtime for at least one distinct unit comprising the process.

13. The system of claim 12, wherein the presentation component is configured to present an indicator of the estimated runtime for the process, and wherein the indicator is a progress bar.

14. A computer-implemented method using one or more processors for updating an estimated runtime for a process comprising at least one of a data download, a software installation, and a software update, the process including a plurality of distinct units, the method comprising:

receiving a first indication to execute at least a portion of the process;

determining based on a system environment which of the plurality of distinct units comprise the portion of the process to be executed;

receiving a first estimated runtime for the portion of the process to be executed, the first estimated runtime comprising a sum of estimated runtimes for each of the distinct units comprising the portion of the process to be executed, wherein the estimated runtime for each of the distinct units comprises an average of two or more actual runtimes of prior runs of the corresponding distinct unit;

presenting a first indicator of the first estimated runtime for the portion of the process to be executed;

recording an actual runtime for each of the distinct units comprising the portion of the process;

automatically updating the estimated runtime for each of the distinct units comprising the portion of the process utilizing the respective recorded actual runtimes;

storing the updated estimated runtime for each of the distinct units; and utilizing one or more of the stored updated estimated runtimes to present a second indicator of a second estimated runtime of the process upon receiving a second indication to execute at least a portion of the process.

15. The method of claim 14, wherein the indicator comprises a progress bar.

16. The method of claim 14, wherein the process comprises at least one of a software installation process and a software updating process.

17. One or more computer-readable storage media having computer-executable instructions for performing the method of claim 14.

* * * * *